(12) United States Patent
Kwok

(10) Patent No.: US 12,482,533 B2
(45) Date of Patent: Nov. 25, 2025

(54) BACKGROUND DATA REFRESH USING SOFT READS

(71) Applicant: SK Hynix NAND Product Solutions Corp., Rancho Cordova, CA (US)

(72) Inventor: Zion Kwok, Burnaby (CA)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 164 days.

(21) Appl. No.: 18/393,056

(22) Filed: Dec. 21, 2023

(65) Prior Publication Data

US 2025/0210127 A1 Jun. 26, 2025

(51) Int. Cl.
*G11C 29/52* (2006.01)
*G11C 11/406* (2006.01)
*G11C 11/4096* (2006.01)

(52) U.S. Cl.
CPC ........ *G11C 29/52* (2013.01); *G11C 11/40615* (2013.01); *G11C 11/4096* (2013.01)

(58) Field of Classification Search
CPC .............. G11C 29/52; G11C 11/40615; G11C 11/4096
See application file for complete search history.

(56) References Cited

U.S. PATENT DOCUMENTS

2015/0332778 A1* 11/2015 Kim ....................... G11C 16/26
365/185.18
2016/0218740 A1* 7/2016 Parthasarathy ........ G11C 29/00

\* cited by examiner

*Primary Examiner* — Han Yang
(74) *Attorney, Agent, or Firm* — Morgan, Lewis & Bockius LLP

(57) ABSTRACT

This application is directed to data validation and refresh in an electronic device having a memory device. The memory device receives an inquiry for a validity condition of a page of the memory device, which includes a plurality of memory cells that store two consecutive data items and correspond to two nominal threshold voltages. In response to the inquiry, the memory device selects a first readout voltage and a second readout voltage between the two nominal threshold voltages, and applies the first readout voltage and the second readout voltage to read the plurality of memory cells and generate first readout data and second readout data, respectively. An error rate of the page is determined based on the first readout data and the second readout data, and in some embodiments, further used to determine whether an error correction process or a background data refresh need to be implemented on the page.

20 Claims, 9 Drawing Sheets

BACKGROUND DATA REFRESH USING SOFT READS

TECHNICAL FIELD

This application relates generally to memory management including, but not limited to, methods, systems, and non-transitory computer-readable media for controlling error correction of a page of a memory device.

BACKGROUND

Memory is applied in a computer system to store instructions and data. The data are processed by one or more processors of the computer system according to the instructions stored in the memory. Multiple memory units are used in different portions of the computer system to serve different functions. Specifically, the computer system includes non-volatile memory that acts as secondary memory to keep data stored thereon if the computer system is decoupled from a power source. Examples of the secondary memory include, but are not limited to, hard disk drives (HDDs) and solid-state drives (SSDs). Over time, some memory contents degrade and have increased numbers of bit errors. For example, bit errors can be introduced into memory pages due to program disturb, read disturb, and loss of retention. If too many bit errors accumulate, corresponding data are uncorrectable. One way to mitigate bit error accumulation is to periodically refresh the memory contents by doing read-modify-write. Under most circumstances, a memory page has few errors, and however, periodic refreshes of the memory still uses a portion of an input/output (I/O) bandwidth and a power budget of the memory device, leaving less I/O bandwidth to process the read or write requests received from the host. It would be beneficial to develop a fast and economical solution to monitor validity conditions of a corresponding memory system and facilitate further adaptive background refreshes based on the validity conditions.

SUMMARY

Various embodiments of this application are directed to methods, systems, devices, non-transitory computer-readable media for monitoring a validity condition and adaptively controlling error correction or background data refresh of a page of a memory device in a memory system. Each page having a high bit error count (e.g., greater than a threshold error number) is identified and refreshed, while pages having low bit error counts are processed with error correction processes. The memory system determines a number of bits in a valley (e.g., corresponding to threshold voltages close to read reference voltages) to estimate a bit error count. Specifically, the memory system returns the number bits in the valley over an I/O bus without using an error correction code (ECC). In some embodiments, the number of bits is counted once per word line instead of once per page in a triple-level cell (TLC) NAND memory device having three subpages per word line. In some embodiments, the number of bits is read from a valley that is most susceptible to bit errors. By these means, as a memory device counts the valley bits and selectively refreshes the pages having high bit error counts without using the ECC, it reduces I/O power consumption, enables higher performance on host reads and writes, and improves a quality of service (QoS) latency.

In one aspect, a method is implemented at a memory device (e.g., a solid-state drive (SSD)) for memory data validation. The method includes receiving an inquiry for a validity condition of a page of the memory device. The page includes a plurality of memory cells that store two consecutive data items and correspond to two nominal threshold voltages. The method further includes, in response to the inquiry, selecting a first readout voltage and a second readout voltage between the two nominal threshold voltages. The method further includes applying the first readout voltage to read the plurality of memory cells to generate first readout data, applying the second readout voltage to read the plurality of memory cells to generate second readout data, and determining an error rate of the page based on the first readout data and the second readout data. Reading the same two consecutive data items with two nominal threshold voltages produces soft information, and may be called a soft read.

In some embodiments, the method further includes, in accordance with a determination that the error rate is below an error threshold, implementing an error correction process on the plurality of memory cells of the page. Alternatively, in some embodiments, the method further includes, in accordance with a determination that the error rate is above an error threshold, refreshing the page including writing content stored in the plurality of memory cells of the page to a new page.

In some embodiments, the first readout data identifies a first number of memory cells that store a first data item of the two consecutive data items, and the second readout data identifies a second number of memory cells that store the first data item. Determining the error rate of the page further includes generating a difference between the first number and the second number based on the first readout data and the second readout data and determining the error rate of the page based on the difference between the first number and the second number. Alternatively, in some embodiments, the first readout data includes a plurality of first data values (e.g., data bits of upper subpages) each of which corresponds to a distinct one of the plurality of memory cells, and the second data includes a plurality of second data values (e.g., data bits of upper subpages) each of which corresponds to a distinct one of the plurality of memory cells. Determining the error rate of the page further includes applying a bitwise logic operation (e.g., a bitwise XOR operation) to combine the first readout data and the second readout data.

Some implementations of this application include an electronic device or a memory system. The electronic device or the memory system includes a controller, a memory device coupled to the controller and including local control circuitry, and memory having instructions stored thereon, which when executed by the memory device cause the memory device to perform any of the above methods.

Some implementations of this application include a memory device that includes control circuitry and memory having instructions stored thereon, which when executed by the control circuitry cause the control circuitry to perform any of the above methods.

Some implementations include a non-transitory computer readable storage medium storing one or more programs. The one or more programs include instructions, which when executed by a memory device cause the memory device to implement any of the above methods.

In some embodiments, the above methods, electronic devices, or non-transitory computer readable storage medium for controlling error correction or background data refresh are also used in data communication (e.g., wireless communication using 5G or Wi-Fi technology, satellite communications, Ethernet communication, and communication via fiber Optic networks).

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices using secondary storage.

Various embodiments of this application are directed to methods, systems, devices, non-transitory computer-readable media for monitoring a validity condition and controlling error correction or background data refresh of a page of a memory device. Each page having a high bit error count (e.g., greater than a threshold error number) is identified and refreshed. The memory system determines a number of bits in a valley (e.g., corresponding to a threshold voltages close to read reference voltages) to estimate a bit error count. Specifically, the memory system returns the number bits in the valley over an I/O bus without using an ECC. In some embodiments, the number of bits is counted once per word line instead of once per page in a triple-level cell (TLC) NAND memory device having three subpages per word line. In some embodiments, the number of bits is read from a valley that is most susceptible to bit errors. In an example, 30% of the NAND word lines have high bit errors. Without this invention, we could perform three normal reads to read the three subpages stored on the word line, we will then write back 30% of the data. So without this invention, we would use the read array power of 3 normal reads and the read I/O bandwidth of 3 normal reads. With this invention, we could perform one soft read, which samples valleys from the three subpages while using double the NAND array power as one normal read and the read I/O bandwidth of one normal read. But for 30% of the word lines, we would additionally need to perform three normal reads, correct the errors in the data, and write back the 30% of the data. So with this invention, we would use the read array power of $2+(30\%\times3)=2.91$ normal reads and the read I/O bandwidth of $1+(30\%\times3)=1.91$ normal reads. The memory system counts the valley bits and selectively refreshes the page having the high bit error count without the ECC, which reduces I/O power consumption and enables higher performance on host reads and writes. It improves a QoS latency as an I/O bus is made more available for host reads and writes.

Figure 1:
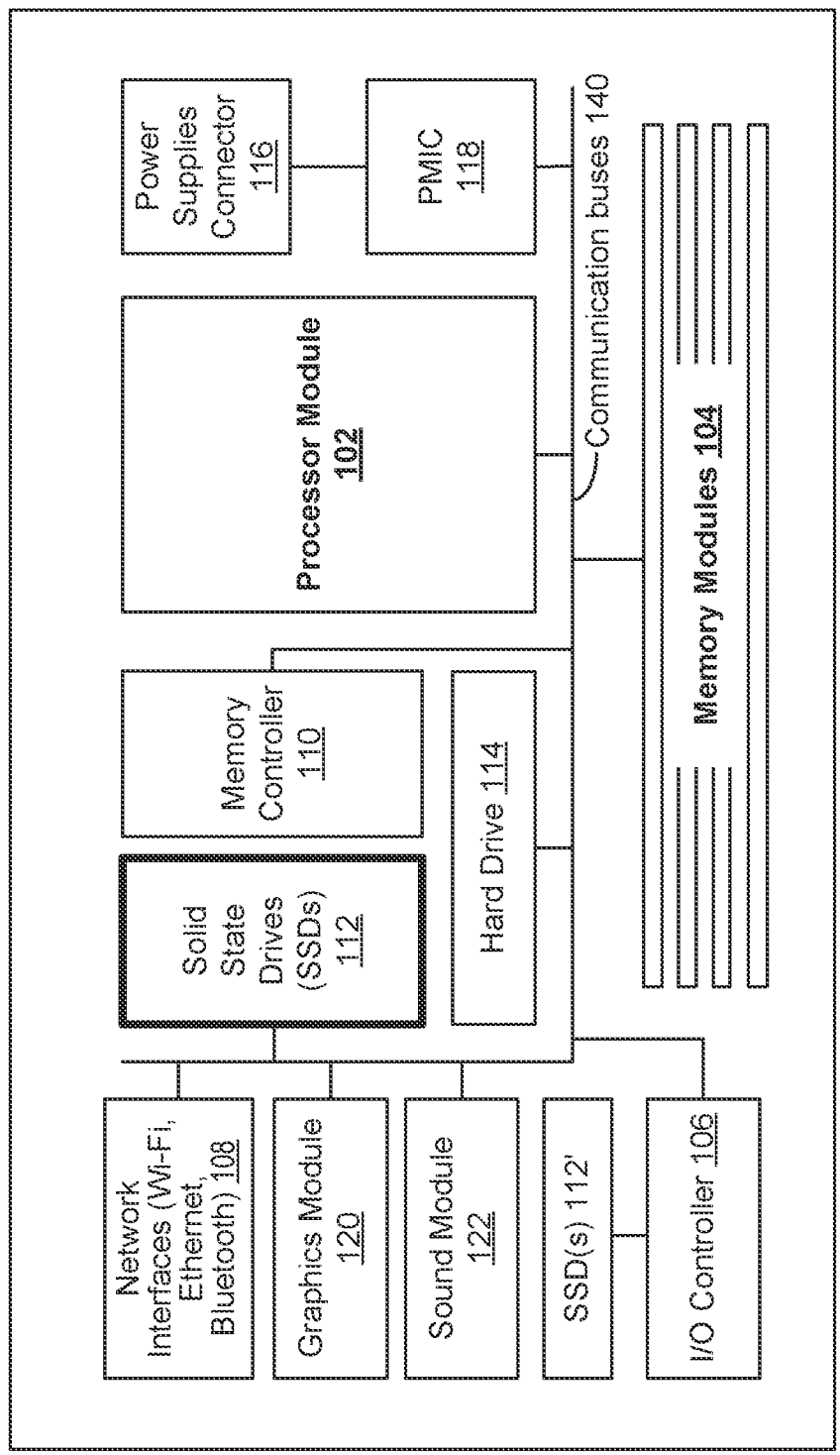
FIG. 1 is a block diagram of an example system module in a typical electronic device in accordance with some embodiments.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a trackpad) via a universal serial bus interface. In some embodiments, the network interfaces 108 includes one or more interfaces for Wi-Fi, Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as static random-access memory (SRAM), double data rate (DDR) dynamic random-access memory (DRAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, SSD(s) 112, an HDD 114, power management integrated circuit (PMIC) 118, a graphics module 120, and a sound module 122. The memory controller 110 is configured to control communication between the processor module 102 and memory components, including the memory modules 104, in the electronic system. The SSD(s) 112 are configured to apply integrated circuit assemblies to store data in the electronic system, and in many embodiments, are based on NAND or NOR memory configurations. The HDD 114 is a conventional data storage device used for storing and retrieving digital information based on electro-mechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. The graphics module 120 is configured to generate a feed of output images to one or more display devices according to their desirable image/video formats. The sound module 122 is configured to facilitate the input and output of audio signals to and from the electronic system under control of computer programs.

Alternatively or additionally, in some embodiments, the system module 100 further includes SSD(s) 112' coupled to the I/O controller 106 directly. Conversely, the SSDs 112 are coupled to the communication buses 140. In an example, the communication buses 140 operates in compliance with Peripheral Component Interconnect Express (PCIe or PCI-E), which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104, SSD(s) 112 or 112', and HDD 114. These new non-transitory computer readable storage media include, but are not limited to, those manufactured from biological materials, nanowires, carbon nanotubes and individual molecules, even though the respective data storage technologies are currently under development and yet to be commercialized.

Some implementations of this application are directed to an integrity check process implemented by a memory system (e.g., SSD(s) 112, memory module 104, HDD 114, memory controller 110), which stores codeword symbols including integrity data, e.g., LDPC codes. The integrity check process is also called a decoding process implementing between variable nodes and check nodes. The variable nodes correspond to the codeword symbols extracted from the memory system. Each check node correspond to a distinct set of variable nodes, and has check node data configured to identify bit errors in the codeword symbols corresponding to the distinct set of variable nodes.

Figure 2:
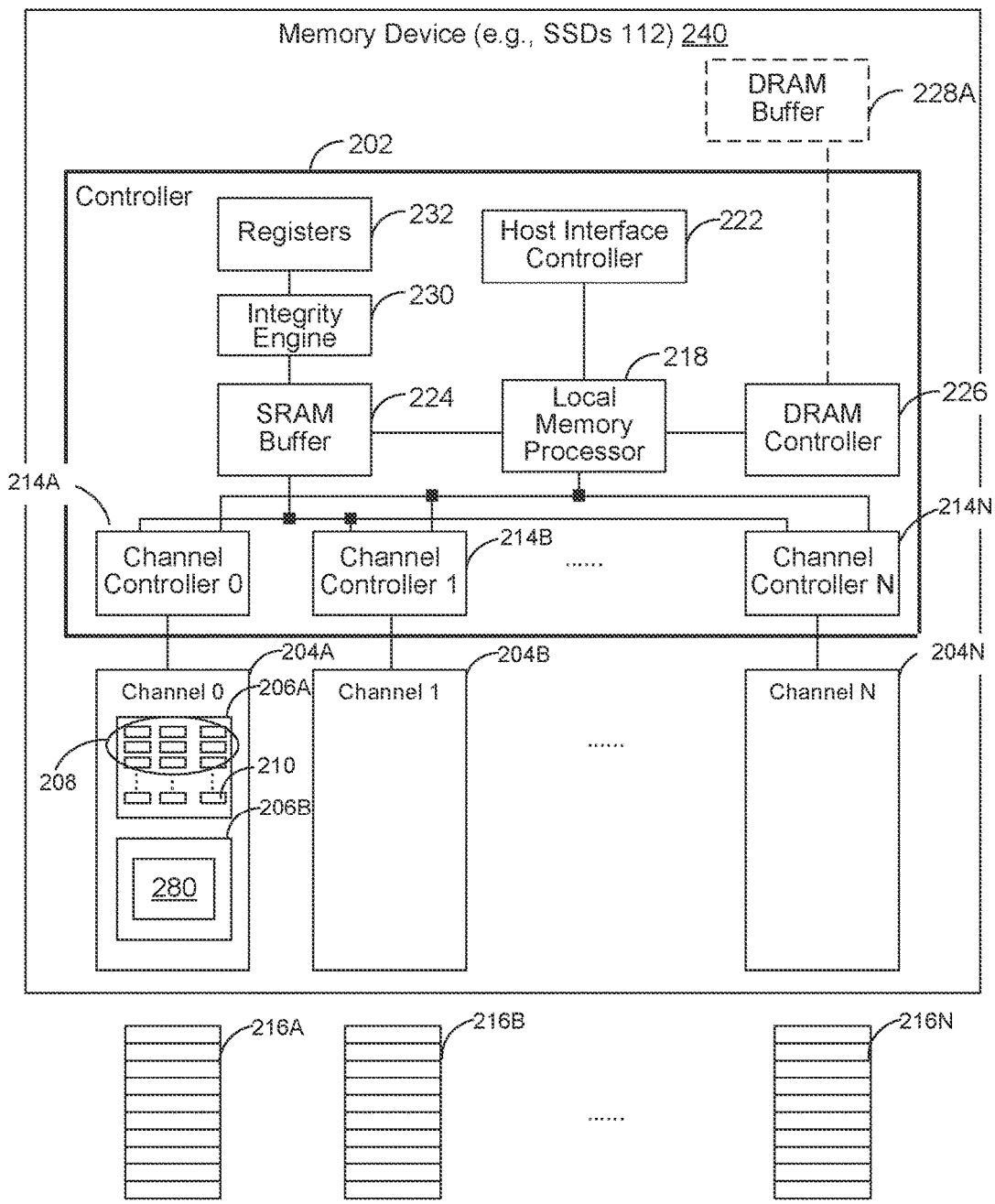
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 includes one or more memory devices 240 (e.g., SSD(s)). Each memory device 240 further includes a controller 202 and a plurality of memory channels 204 (e.g., channel 204A, 204B, and 204N). Each memory channel 204 includes a plurality of memory cells. The controller 202 is configured to execute firmware level software to bridge the plurality of memory channels 204 to the host device 220. In some embodiments, each memory device 240 is formed on a printed circuit board (PCB).

Each memory channel 204 includes on one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory device 240 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory device 240 stores information of an ordered list of superblocks in a cache of the memory device 240. In some embodiments, the cache is managed by a host driver of the host device 220, and called a host managed cache (HMC).

In some embodiments, the memory device 240 includes a single-level cell (SLC) NAND flash memory chip, and each memory cell stores a single data bit. In some embodiments, the memory device 240 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory device 240 corresponds to a single queue 216 of memory access requests. Each memory access request is optionally received internally from the memory device 240 to manage the respective memory channel 204 or externally from the host device 220 to write or read data stored in the respective channel 204. Specifically, each memory access request includes one of: a system write request that is received from the memory device 240 to write to the respective memory channel 204, a system read request that is received from the memory device 240 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228A that is included in memory device 200, e.g., by way of the DRAM controller 226. Alternatively, in some embodiments, the local memory processor 218 stores data to be written into, or read from, each memory block in the plurality of memory channels 204 in a DRAM buffer 228B that is main memory used by the processor module 102 (FIG. 1). The local memory processor 218 of the controller 202 accesses the DRAM buffer 228B via the host interface controller 222.

In some embodiments, data in the plurality of memory channels 204 is grouped into coding blocks, and each coding block is called a codeword. For example, each codeword includes n bits among which k bits correspond to user data and (n-k) corresponds to integrity data of the user data, where k and n are positive integers. In some embodiments, the memory device 200 includes an integrity engine 230 (e.g., an LDPC engine) and registers 232 including a plurality of registers or SRAM cells or flip-flops and coupled to the integrity engine 230. The integrity engine 230 is coupled to the memory channels 204 via the channel controllers 214 and SRAM buffer 224. Specifically, in some embodiments, the integrity engine 230 has data path connections to the SRAM buffer 224, which is further connected to the channel controllers 214 via data paths that are controlled by the local memory processor 218. The integrity engine 230 is configured to verify data integrity for each coding block of the memory channels 204.

In some embodiments of this application, the memory controller 202 is coupled to a local controller 280 disposed within a memory package, a memory die 206, or a memory plane 208. A memory system 200 includes a plurality of memory packages. In at least a subset of memory packages, each respective memory package includes a local controller 280 for monitoring and reporting validity conditions of its pages. The memory controller 202 or local controller 280 is configured to obtain an inquiry for a validity condition of a page 210 of the memory device. The page 210 includes a plurality of memory cells that store two consecutive data items and correspond to two nominal threshold voltages. In response to the inquiry, the controller 202 or 280 selects a first readout voltage and a second readout voltage between the two nominal threshold voltages, and applies the first readout voltage and the second readout voltage to read the plurality of memory cells and generate first readout data and second readout data, respectively. An error rate of the page 210 is determined based on the first readout data and the second readout data, and further used to determine whether an error correction process or a background data refresh need to be implemented on the page in different situations.

Figure 3:
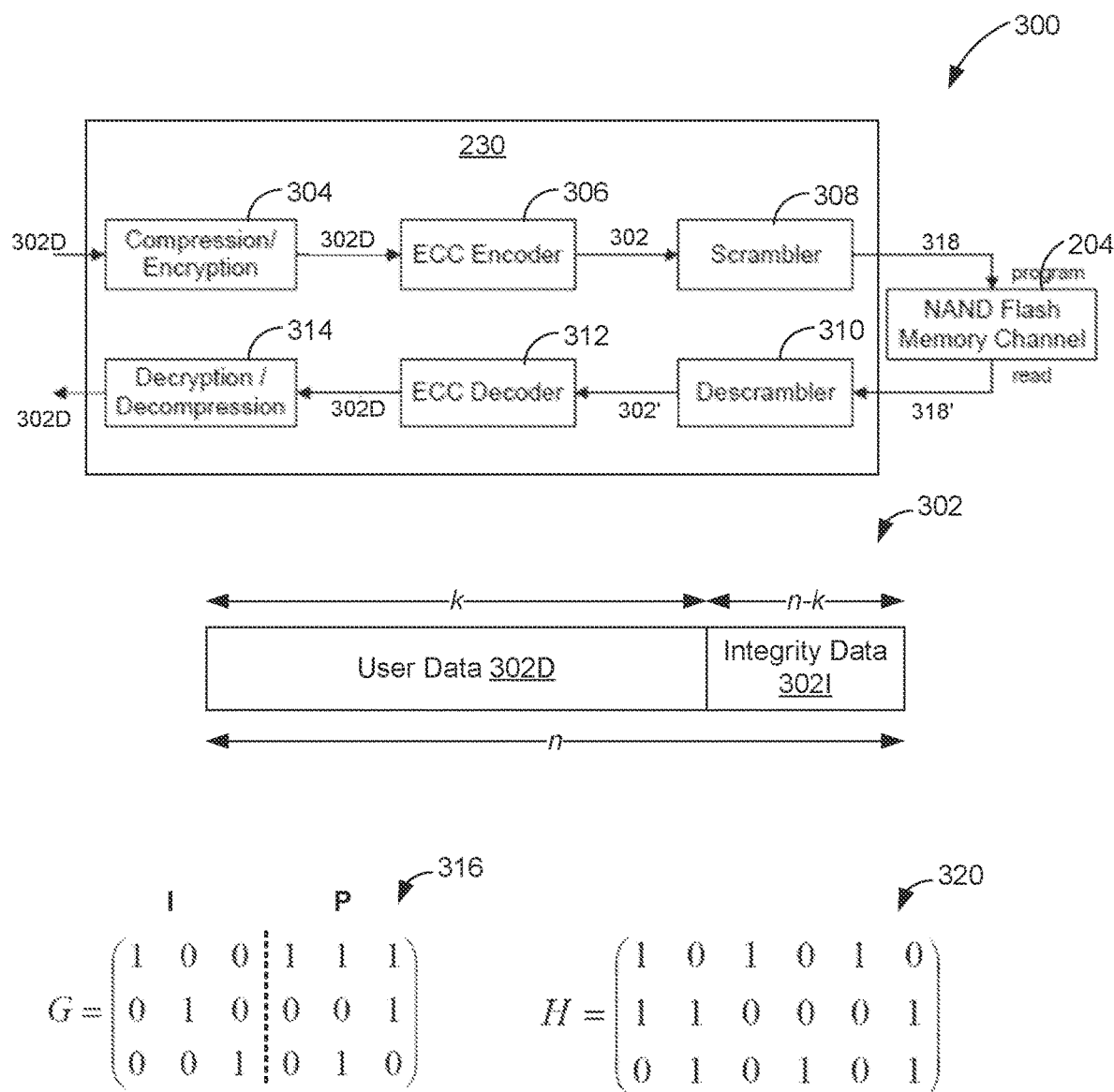
FIG. 3 is a block diagram of an example integrity check system of a memory system for processing a codeword, in accordance with some embodiments.

FIG. 3 is a block diagram of an example integrity check system 300 of a memory system 200 for processing a codeword 302, in accordance with some embodiments. The integrity check system 300 includes a plurality of memory channels 204, an integrity engine 230 (e.g., an LDPC engine), and a registers 232. Data stored in memory channels 204 of the memory system 200 (FIG. 2) is grouped into coding blocks, and each coding block is called a codeword 302. Each codeword 302 further includes n data bits among which k data bits are user data 302D and (n-k) data bits are integrity data 302I of the user data 302D, where k and n are positive integers. The integrity check system 300 is configured to verify data integrity for each codeword 302 of the memory channels 204.

In some embodiments, the integrity engine 230 further includes one or more of: a compression module 304, an error correction code (ECC) encoder 306, a scrambler 308, a descrambler 310, an ECC decoder 312, and a decompression module 314. The compression module 304 obtains user data 302D and processes (e.g., compresses, encrypts) the user data 302D. The ECC encoder 306 obtains the user data 302D that is optionally processed by the compression module 304, and applies a parity data generation matrix G (316) on the user data 302D to encode the codeword 302. The matrix G (316) has k rows and n columns. A systematic form of the matrix G includes an identify matrix I configured to preserve the user data 302D within the codeword 302 and a parity matrix P configured to generate the integrity data 302I from the user data 302D. In some embodiments, the matrix G (316) is not unique and includes a set of basis vectors for a vector space of valid codewords 302. The scrambler 308 obtains the codeword 302 including n data bits and converts the n data bits to a scrambled codeword 318 having a seemingly random output string of n data bits. The scrambled codeword 318 is stored in the memory channels 204 of the memory system 200.

During decoding, the scrambled codeword 318' is extracted from the memory channel 204 of the memory system 200. The descrambler 310 recovers a codeword 302' from the extracted codeword 318', and the ECC decoder 312 verifies whether the recovered codeword 302' is valid and corrects erroneous bits in the recovered codeword 302, thereby providing the valid codeword 302 including the valid user data 302D. In some embodiments, the decompression module 314 obtains the user data 302D and processes (e.g., decompresses, decrypts) the user data 302D. In some embodiments, for integrity check, the ECC decoder 312 multiplies a parity-check matrix H (320) with the recovered codeword 302' to generate a syndrome vector S. The parity check matrix H (320) includes n-k rows corresponding to n-k parity check equations and n columns corresponding to n codeword bits. A relationship of the recovered codeword 302' and the syndrome vector s is represented as follows:

$$S = yH^T \quad (1)$$

where y is the recovered codeword 302'. In some embodiments, in accordance with a determination that the syndrome s is equal to 0, the ECC decoder 312 determines that all parity-check equations associated with the parity-check matrix H are satisfied and that the recovered codeword 302' is valid. Conversely, in accordance with a determination that the syndrome is not equal to 0, the ECC decoder 312 determines that at least a predefined number (e.g., one, two) parity check equation associated with the parity-check matrix H is not satisfied and that the recovered codeword 302' is not valid. Alternatively, in some embodiments, the ECC decoder 312 operates to solve the following equation:

$$S = eH^T \quad (2)$$

where e is an error vector. The syndrome vector s is a combination of the error vector e and a valid codeword 302. Given that the syndrome vector s and the parity check matrix H are known, the ECC decoder 312 solves equation (2) to obtain the error vector e and identify the erroneous bits in the recovered codeword 302'.

Figure 4A:
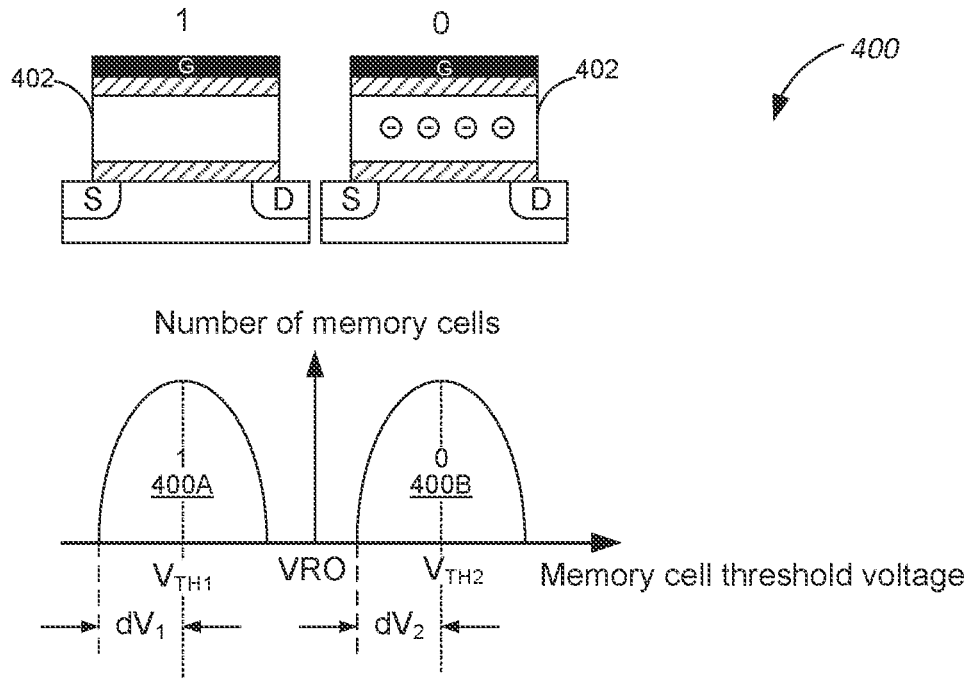
FIG. 4A illustrates an example memory cell threshold voltage probability distribution of a single-level cell (SLC) memory cell, in accordance with some embodiments.

FIG. 4A illustrates an example memory cell threshold voltage probability distribution 400 of an SLC memory cell, in accordance with some embodiments. The SLC memory cell has a gate G, a source S, and a drain D. Either "1" or "0" is stored in each SLC memory cell in accordance with a relationship between a current $I_G$ flowing between the source S and the drain D and a gate voltage $V_G$ applied on the gate of the SLC memory cell. The higher the gate voltage ($V_G$) is, the easier it is for the current $I_G$ to flow. The gate voltage $V_G$ has a threshold voltage $V_{TH}$ for which the current $I_G$ flows (e.g., is greater than a current threshold $I_{GTH}$). Either value (e.g., "1" or "0") stored in the SLC memory cell has a respective threshold voltage $V_{TH}$. For example, the SLC memory cell storing "1" has a first threshold voltage $V_{TH1}$, and the SLC memory cell storing "0" has a second threshold voltage $V_{TH2}$. The first threshold voltage $V_{TH1}$ is lower than the second threshold voltage $V_{TH2}$.

The threshold voltage of each SLC memory cell depends at least in part on a number of excess electrons existing in a charge storage film 402. In some embodiments, the charge storage film 402 is a floating gate. In some embodiments, the charge storage film 402 is charge trap. In some embodiments, the lower the number of excess electrons in the charge storage film 402 is, the easier it is for the current $I_G$ to flow. The first threshold voltage $V_{TH1}$ is low because there are no or few excess electrons in the charge storage film 402, and the second threshold voltage $V_{TH2}$ is higher than the first threshold voltage $V_{TH1}$ because there are more excess electrons in the charge storage film 402. In some embodiments, a memory device 240 has large number of memory cells (e.g., 250-500 GB). Even if all of the memory cells of the memory device 240 store the same data (e.g., "1" or "0"), the memory cells of the memory device 240 differ in their threshold voltages $V_{TH1}$ or $V_{TH2}$, which have a probability distribution 400. Referring to FIG. 4A, in some embodiments, the memory cells of the memory device 240 have the same probability of storing "1" and "0." A number of the memory cells has two peaks at the first threshold voltage $V_{TH1}$ corresponding to "1" and the second threshold voltage $V_{TH2}$ corresponding to "0." A first peak number of memory cells having the first threshold voltage $V_{TH1}$ is substantially equal to a second peak number of memory cells having the second threshold voltage $V_{TH2}$. The first peak number of memory cells drops below a threshold valley number or to zero within a first deviation voltage $dV_1$ on both sides of the first threshold voltage $V_{TH1}$, forming a threshold voltage probability distribution 400A for data "1." The second peak number of memory cells drops below a threshold valley number or to zero within a second deviation voltage $dV_2$ on both sides of the second threshold voltage $V_{TH2}$, forming a threshold voltage probability distribution 400B for data "0."

During a read operation, the gate voltage $V_G$ is set to a readout voltage VRO, which is between the threshold voltage probability distribution 400A for data "1" and the threshold voltage probability distribution 400B for data "0". For memory cells storing "1," the first threshold voltages $V_{TH1}$ are lower than the readout voltage VRO, and currents $I_G$ flow in the memory cells storing "1." Conversely, for memory cells storing "0," the second threshold voltages $V_{TH2}$ are higher than the readout voltage VRO, and currents $I_G$ do not flow or are substantially low (e.g., smaller than the current threshold $I_{GTH}$) in the memory cells storing "0."

Figure 4B:
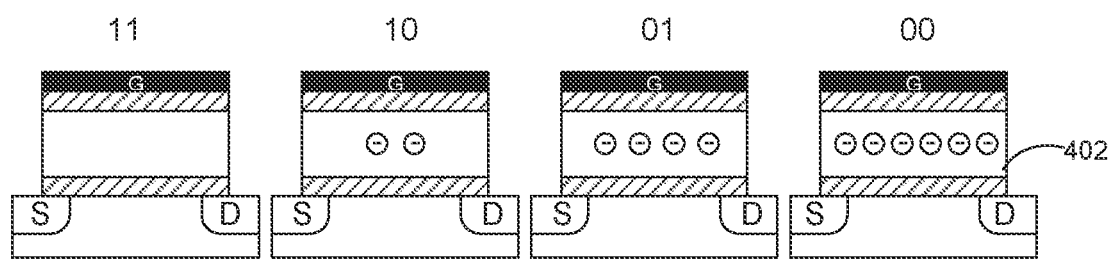
FIGS. 4B and 4C illustrate example memory cell threshold voltage probability distributions of a multi-level cell (MLC) memory cell and an TLC memory cell, in accordance with some embodiments, respectively.
Figure 4C:
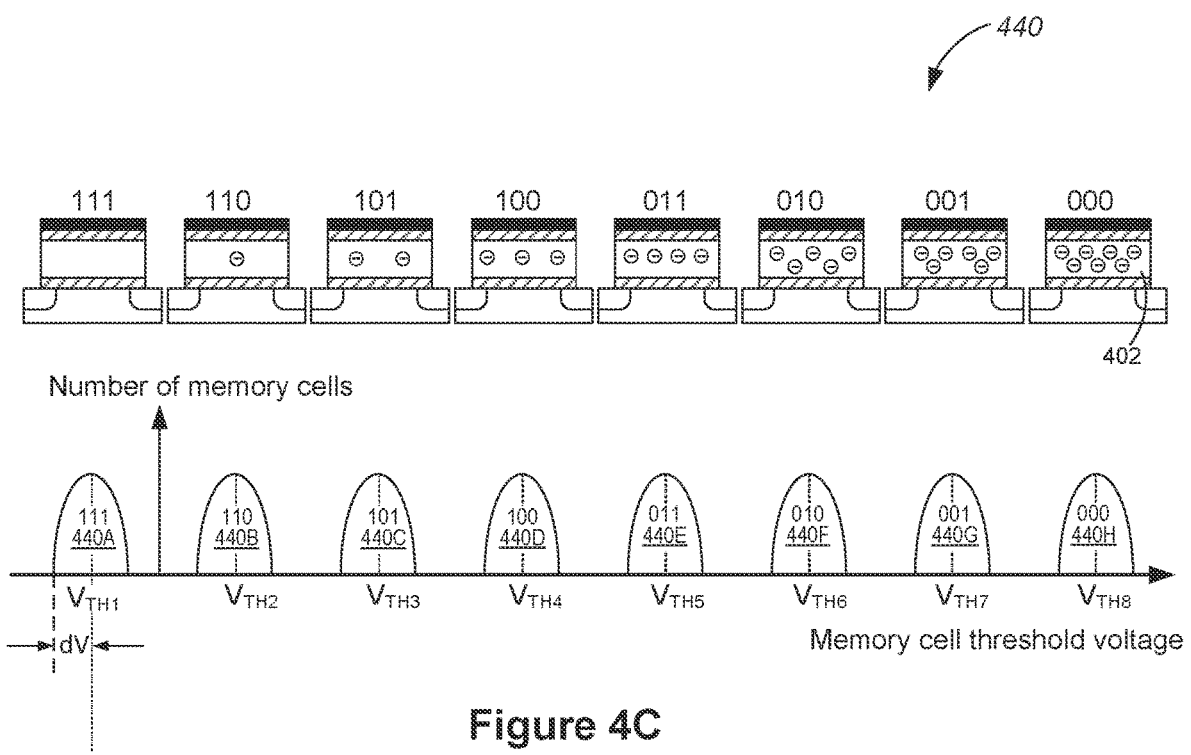

FIGS. 4B and 4C illustrate example memory cell threshold voltage probability distributions 420 and 440 of an MLC memory cell and an TLC memory cell, in accordance with some embodiments, respectively. Each MLC or TLC memory cell has a gate G, a source S, and a drain D. In accordance with a relationship between a current $I_G$ flowing between the gate G and the drain D and a gate voltage $V_G$ applied on the gate, each of four data values "11," "10," "01," and "00" is stored in the MLC memory cell, and each of eight data values "111," "110," "101," "100," "011," "010," "001," and "000" is stored in the TLC memory cell. The gate voltage $V_G$ has a threshold voltage $V_{TH}$ for which the current $I_G$ flows (e.g., is greater than a current threshold $I_{GTH}$). Each value stored in the respective memory cell has a respective threshold voltage $V_{TH}$. For example, the MLC memory cell storing "11," "10," "01," or "00" has a threshold voltage $V_{TH1}$, $V_{TH2}$, $V_{TH3}$, or $V_{TH4}$, respectively. The TLC memory cell storing "111," "110," "101," "100," "011," "010," "001," and "000" has a threshold voltage $V_{TH1}$, $V_{TH2}$, $V_{TH3}$, $V_{TH4}$, $V_{TH5}$, $V_{TH6}$, $V_{TH7}$, or $V_{TH8}$, respectively.

The threshold voltage of each memory cell depends at least in part on a number of excess electrons existing in a charge storage film 402. In some embodiments, the lower the number of excess electrons in the charge storage film 402 is, the lower the threshold voltage is and the easier it is for the current $I_G$ to flow. In some embodiments, even if all of the MLC or TLC memory cells of the memory device 240 store the same data, these memory cells of the memory device 240 differ in the numbers of excess electrons in the charge storage films 402 and their associated threshold voltages, which have a probability distribution 420 or 440. Referring to FIG. 4B, in some embodiments, the memory cells of the memory device 240 have the same probability of storing "11," "10," "01," and "00." A number of the memory cells has four peaks at the threshold voltages $V_{TH1}$, $V_{TH2}$, $V_{TH3}$, and $V_{TH4}$, corresponding to "11," "10," "01," and "00," respectively. The four peak numbers of memory cells having the threshold voltages $V_{TH1}$, $V_{TH2}$, $V_{TH3}$, and $V_{TH4}$ are substantially equal to one another. Each peak number of memory cells drops below a threshold valley number or to zero within a respective deviation voltage dV on both sides of the respective threshold voltage, forming a threshold voltage probability distribution 420A, 420B, 420C, or 420D.

Referring to FIG. 4C, in some embodiments, the memory cells of the memory device 240 have the same probability of storing "111," "110," "101," "100," "011," "010," "001," and "000." A number of the memory cells has eight peaks at the threshold voltages $V_{TH1}$, $V_{TH2}$, $V_{TH3}$, $V_{TH4}$, $V_{TH5}$, $V_{TH6}$, $V_{TH7}$, and $V_{TH8}$ corresponding to "111," "110," "101," "100," "011," "010," "001," and "000," respectively. The eight peak numbers of memory cells having the threshold voltages $V_{TH1}$ to $V_{TH8}$ are substantially equal to one another. Each peak number of memory cells drops below a threshold valley number or to zero within a respective deviation voltage dV on both sides of the respective threshold voltage, forming a threshold voltage probability distribution 440A, 440B, 440C, 440D, 440E, 440F, 440G, or 440H.

Referring to FIGS. 4B and 4C, during a read operation, the gate voltage $V_G$ is set to a readout voltage VRO, which is between two threshold voltage probability distributions (e.g., 420A for a first data "11" and 420B for a second data "10," 440A for a first data "111" and 440B for a second data "110"). The threshold voltages $V_{TH1}$ of the memory cells storing the first data are lower than the readout voltage VRO, and their associated currents $I_G$ flow. Conversely, the threshold voltages $V_{THs}$ of the memory cells storing the second data are higher than the readout voltage VRO, and their associated currents $I_G$ do not flow or are substantially low (e.g., smaller than the current threshold $I_{GTH}$).

Figure 5:
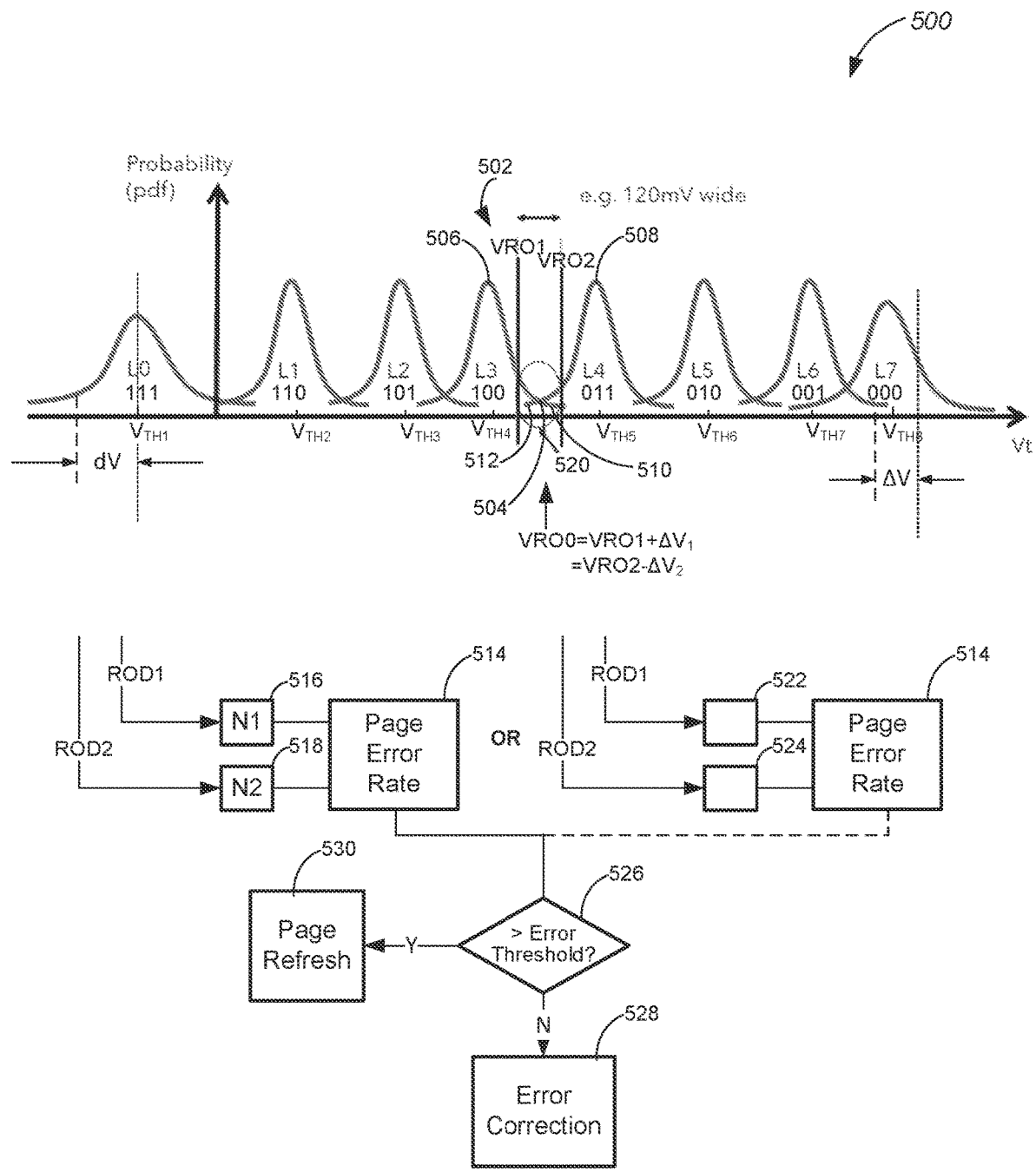
FIG. 5 illustrates an example memory cell threshold voltage probability distribution of an TLC memory cell, in accordance with some embodiments.

FIG. 5 illustrates an example memory cell threshold voltage probability distribution 500 of an TLC memory cell, in accordance with some embodiments. The TLC memory cell is configured to store one of eight data values including "111," "110," "101," "100," "011," "010," "001," and "000." The TLC memory cell storing "111," "110," "101," "100," "011," "010," "001," or "000" has a distinct threshold voltage $V_{TH1}$, $V_{TH2}$, $V_{TH3}$, $V_{TH4}$, $V_{TH5}$, $V_{TH6}$, $V_{TH7}$, or $V_{TH8}$, respectively. The threshold voltage of each memory cell depends at least in part on a number of electrons existing in a charge storage film 402. The lower the number of electrons in the charge storage film 402 is, the lower the threshold voltage is and the easier it is for the current $I_G$ to flow. In some embodiments, the memory cells of the memory device 240 have distinct numbers of memory cells, and distinct probabilities of, storing "111," "110," "101," "100," "011," "010," "001," and "000." A probability of storing an available value has eight peaks with respect to the threshold voltages $V_{TH1}$, $V_{TH2}$, $V_{TH3}$, $V_{TH4}$, $V_{TH5}$, $V_{TH6}$, $V_{TH7}$, and $V_{TH8}$ corresponding to "111," "110," "101," "100," "011," "010," "001," and "000," respectively, so does a number of memory cells. In some embodiments, each peak probability drops below a threshold valley probability or to zero within a respective deviation voltage dV on both sides of the respective threshold voltage, forming a threshold voltage probability distribution L0, L1, L2, L3, L4, L5, L6, or L7. In some embodiments, eight peak probabilities are substantially equal to one another. In some embodiments, at least two of the eight peak probabilities are not equal to each other.

Each of the threshold voltage probability distributions L0 to L7 spreads out over a spreading range, e.g., which approximates twice of the respective deviation voltage 2 dV. A valley 502 forms between every two immediately adjacent distributions of the threshold voltage probability distributions L0 to L7. In some embodiments, each of the distributions L0-L7 has a relatively wide spreading range (e.g., greater than a threshold range), and the spreading ranges of the two immediately adjacent distributions overlap. In some embodiments, neither of the probability values of the two immediately adjacent distributions drops to the threshold valley probability or to zero on a bottom 504 of their associated valley 502. For example, in some embodiments, peaks values of threshold voltage probability distributions L3 and L4 drops from their peaks 506 and 508 to the bottom 504 of the valley 502 and are equal to each other on the bottom 504. In some embodiments, a readout voltage VRO is equal to or near a threshold voltage corresponding to the bottom 504 of the valley 502, and erroneous readout results are extracted from memory cells that have threshold voltages close to the bottom 504 of the valley 502. For example, in some embodiments, the memory cells corresponding to a distribution tail 510 of the threshold voltage probability distributions L3 is erroneously read as "011" (not "100"), because their threshold voltages are higher than the readout voltage VRO that is equal to the threshold voltage corresponding to the bottom 504 of the valley 502. The memory cells corresponding to a distribution tail 512 of the threshold voltage probability distributions L4 is erroneously read as "100" (not "011"), because their threshold voltages are lower than the readout voltage VRO that is equal to the threshold voltage corresponding to the bottom 504 of the valley 502.

A memory device 240 receives an inquiry for a validity condition of a page 210 of the memory device 240. The page 210 includes a plurality of memory cells that store at least two consecutive data items (e.g., "100" and "011") and correspond to two nominal threshold voltages (e.g., $V_{TH4}$ and $V_{TH5}$). In response to the inquiry, the memory device 240 selects a first readout voltage VRO1 and a second readout voltage VRO2 between the two nominal threshold voltages. The memory device 240 applies the first readout voltage VRO1 to read the plurality of memory cells and generate first readout data ROD1, and applies the second readout voltage VRO2 to read the plurality of memory cells and generate second readout data ROD2. An error rate 514 of the page 210 is determined based on the first readout data ROD1 and the second readout data ROD2. In some embodiments, each of a subset of the plurality of memory cells stores one of the two consecutive data items (e.g., "100" or "011") and has a respective threshold voltage (e.g., $V_{TH4}$ or $V_{TH5}$) corresponding to the stored data item. Based on the respective threshold voltages of memory cells, a number of memory cells storing a first data item (e.g., "100") reaches a first peak at a first nominal threshold voltage (e.g., $V_{TH4}$), and a number of memory cells storing a second data item (e.g., "011") reaches a second peak at a second nominal threshold voltage (e.g., $V_{TH5}$). For example, the memory cells storing the first and second data items correspond to threshold voltage probability distributions L3 and L4, respectively.

In some embodiments, a nominal readout voltage VRO0 is identified for reading the plurality of memory cells. The first readout voltage VRO1 is less than the nominal readout voltage ROD1 by a first variation $\Delta V_1$, and the second readout voltage VRO2 is greater than the nominal readout voltage VRO0 by a second variation $\Delta V_2$. In an example, the nominal readout voltage VRO0 is an average of the two nominal threshold voltages (e.g., $V_{TH4}$ and $V_{TH5}$). In another example, the nominal readout voltage VRO0 corresponds to the bottom 504 of the valley 502 at which the probabilities of having an associated threshold voltage associated with the distributions L3 and L4 are equal. In some embodiments, the first variation $\Delta V_1$ is predefined and equal to the second variation $\Delta V_2$. The first variation $\Delta V_1$ and the second variation $\Delta V_2$ define a readout range 520 within the valley 502. The readout range 520 is smaller than the valley 502 and fully enclosed between the two nominal threshold voltages (e.g., $V_{TH4}$ and $V_{TH5}$). In an example, a difference of the readout voltage VRO1 and VRO2 (i.e., a sum of the variations $\Delta V_1$ and $\Delta V_2$) is equal to 120 mV.

In some embodiments, the first readout data ROD1 identifies a first number 516 of memory cells that store a first data item (e.g., "100") of the two consecutive data items, and the second readout data ROD2 identifies a second number 518 of memory cells that store the first data item (e.g., "011"). A difference between the first number and the second number is determined based on the first readout data ROD1 and the second readout data ROD2. The error rate 514 of the page 210 is determined based on the difference between the first number 516 and the second number 518.

Alternatively, in some embodiments, the first readout data ROD1 includes a plurality of first data values 522 each of which corresponds to a distinct one of the plurality of memory cells, and the second readout data ROD2 includes a plurality of second data values 524 each of which corresponds to a distinct one of the plurality of memory cells. The error rate 514 of the page 210 is determined by applying a bitwise logic operation to combine the plurality of first data values 522 of the first readout data ROD1 and the plurality of second data values 524 of the second readout data ROD2. For example, a bitwise XOR logic is applied to combine each of the plurality of first data values 522 (e.g., equal to "100" or "011") with a respective one of the plurality of second data values 524 (e.g., equal to "100" or "011") to determine whether they are identical to each other on a bit level. A mismatching number is counted to indicated how many pairs of two associated data values in the plurality of first data values 522 and the plurality of second data values 524 are not equal to each other, and used to determine the page error rate 514 of the page 210.

In some embodiments, in accordance with a determination (operation 526) that the error rate 514 is below an error threshold, the memory device 240 implements an error correction process 528 on the plurality of memory cells of the page, thereby correcting a subset of memory cells of the page 210 that have been identified as including error bits. Memory cells corresponding to the distribution tail 510 of the distribution L3 stores a first data item (e.g., "100"), and however, is erroneously read as a second data item (e.g., "011"). Memory cells corresponding to the distribution tail 512 of the distribution L4 stores the second data item (e.g., "011"), and however, is erroneously read as the first data item (e.g., "100"). When different readout voltages VRO1 and VRO2 are applied, the memory cells corresponding to the distribution tail 510 are different, so are the memory cells corresponding to the distribution tail 512. In some embodiments, the page error rate 514 indicates the difference of the memory cells corresponding to the distribution tails 510 and 512 under different readout voltages VRO1 and VRO2. The error correction process identifies and corrects the memory cells corresponding to the distribution tails 510 and 512 by an error correction method.

Conversely, in some embodiments, in accordance with a determination that the error rate 514 is above the error threshold, a background data refresh 530 is applied to create a new page with writing content stored in the plurality of memory cells. The new page is physically located at a different memory address from that of the original page having erroneous data. Data are recovered from a redundant copy to replace the erroneous data of the subset of memory cells.

In some embodiments, a memory page 210 is affected by program disturb, read disturb, and charge loss over time. A background data refresh operation is applied to clear bit errors periodically. Content is read from the memory page 210 and programmed to a different memory page where bit errors are corrected. In some embodiments, a memory page 210 is read (e.g., loaded into a cache of a memory controller 202 of the memory device 240), and an error correction operation is applied to count a number of bit errors in the memory page 210. If the number of bit errors is low (e.g., less than an error threshold), the bit errors are corrected locally, and contents of the memory page 210 do not need to be written to another memory page, which helps conserve write power and write I/O bandwidth and improve QoS for host reads. Conversely, if the number of bit errors is high (e.g., above the error threshold), the contents of the memory page 210 is programmed to a distinct memory page 210. In some embodiments, the memory device 240 includes NAND flash memory, and each memory cell includes an NAND memory cell.

Figure 6:
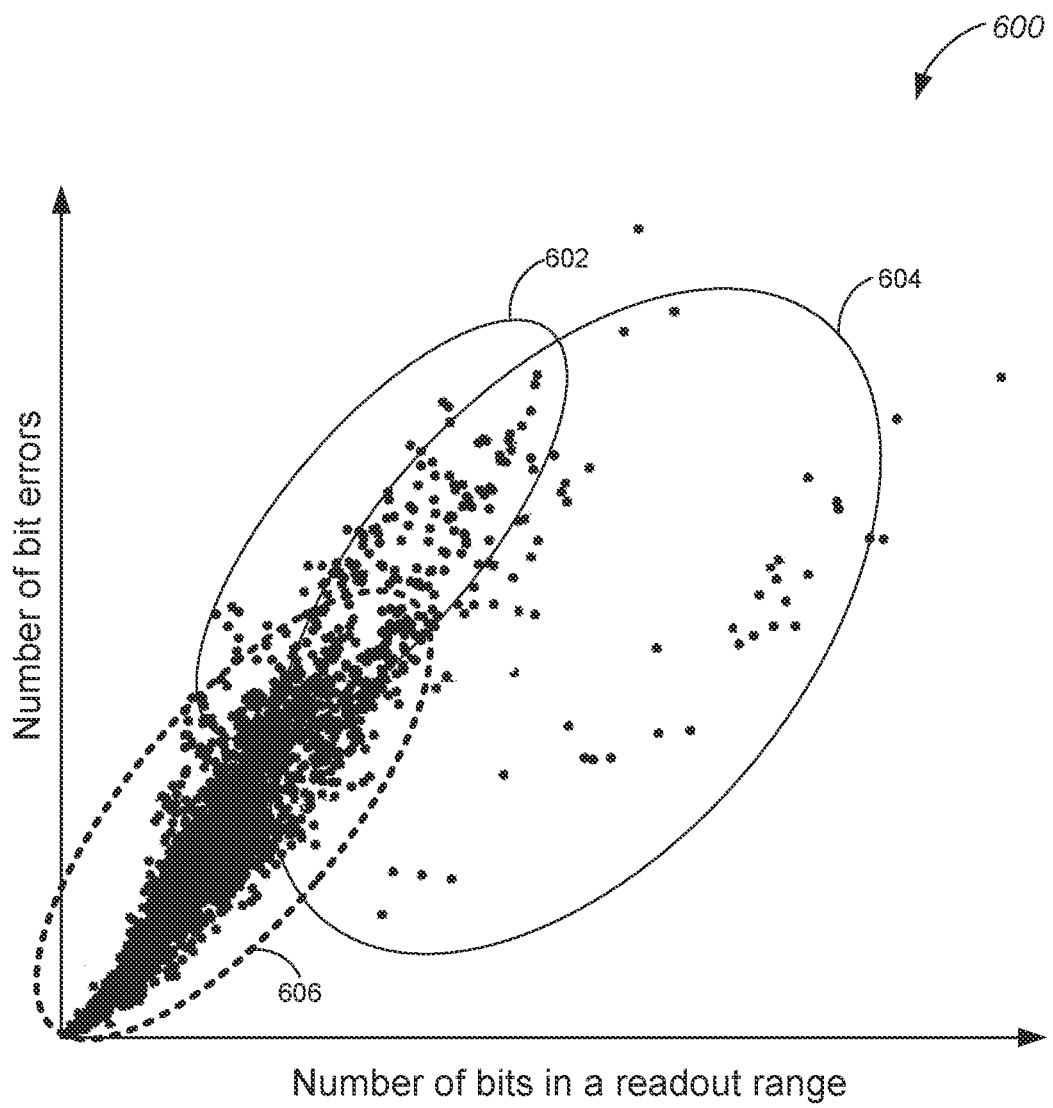
FIG. 6 is a diagram illustrating a correlation between a number of bit errors and a number of bits in a readout range, in accordance with some embodiments.

FIG. 6 is a diagram illustrating a correlation 600 between a number of bit errors and a number of bits in a readout range 520, in accordance with some embodiments. In an example, the readout range 520 is 120 mV wide. In some embodiments, an optimal readout voltage VROO corresponds to a smallest number of bit errors. A middle point of the readout range 520 shifts to the right or to the left of the optimal readout voltage VROO, resulting in a larger variation of bit errors than that corresponding to the middle point of the readout range 520 overlapping the optimal readout voltage VROO. For example, a first set of points 602 corresponds to a readout range 520 having a middle point that shifts to the left of the optimal readout voltage VROO, and a second set of points 604 corresponds to a readout range 520 having a middle point that shifts to the right of the optimal readout voltage VROO. A third set of points 606 corresponds to a readout range 520 having a middle point that overlaps the optimal readout voltage VROO. The variation of the error bits for the first set of points 602 and the second set of points 604 is greater than that for the third set of points. In some embodiments, the optimal readout voltage VROO is the bottom 504 of the valley 502, where two probabilities of having an associated threshold voltage associated with the two immediately adjacent distributions (e.g., L3 and L4 in FIG. 5) are equal.

In some embodiments, there is a strong correlation between the number of bit errors (E) and the number of bits in the valley (V). A NAND dataset has valleys that are 120 mV wide spanning the threshold voltage (Vt) range on both sides of a read reference voltage. Two read strobes are applied on a lower boundary and an upper boundary of the valley, respectively. When the midpoint of the valley was very close to the optimal read reference, then E may be estimated from V by multiplying V by a constant value. When midpoint of the valley was offset to the right or the left of an optimal read reference, estimating E by multiply V by a constant value will be less accurate in many cases, as there is a wider variation in the relationship between E and V.

In some embodiments, each memory page 210 is read in response to a soft read command. The memory device 240 counts a number of bits in the valley 502 between two immediately adjacent distributions, e.g., L4 and L5 in FIG. 5. This increases memory read array power, reduces a read I/O power, increases a read latency, reduces a read I/O bandwidth, and possibly improves QoS for host reads by reducing background memory operations. The number of bits in the valley is correlated with the number of bit errors in most cases. If the number of bits in the valley 502 is low, the contents do not need to be written to another page, which thereby reduces write power and write I/O bandwidth and improves QoS for host reads by reducing background memory operations. If the number of bits in the valley is high, the content of the page is programmed to a distinct page.

Figure 7A:
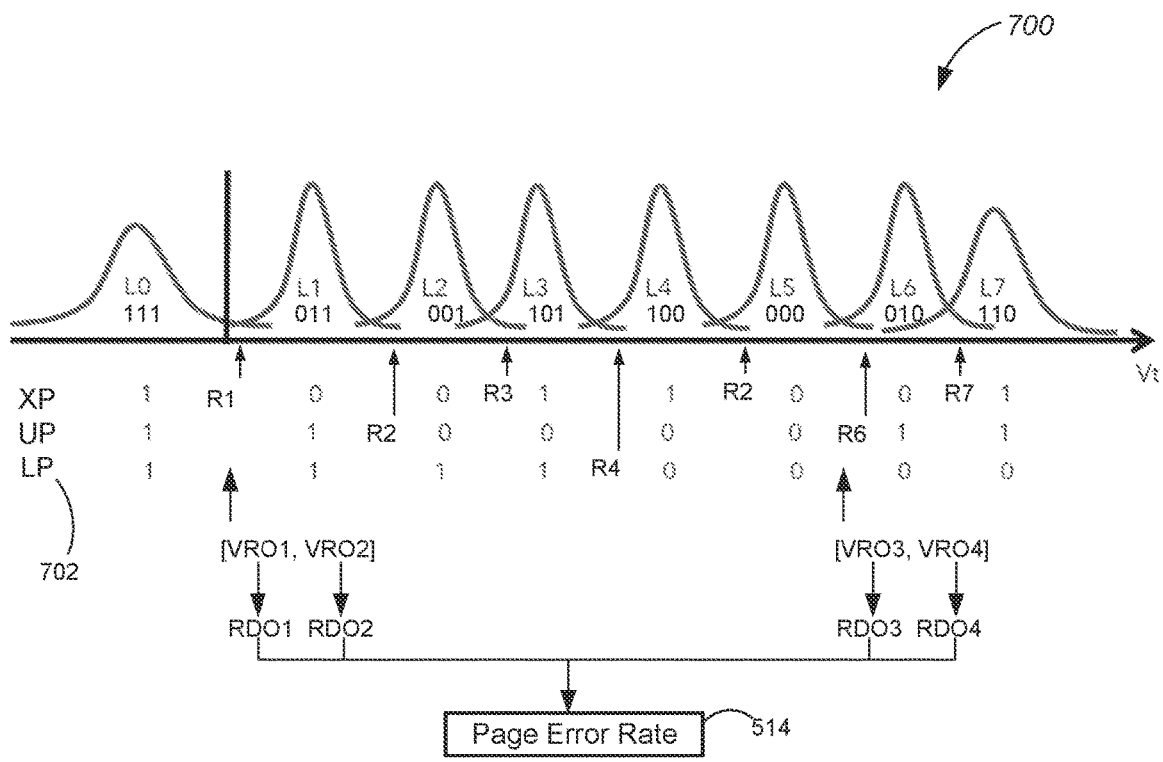
FIG. 7A illustrates a page scheme of a memory device having a plurality of TLC memory cells, in accordance with some embodiments.
Figure 7B:
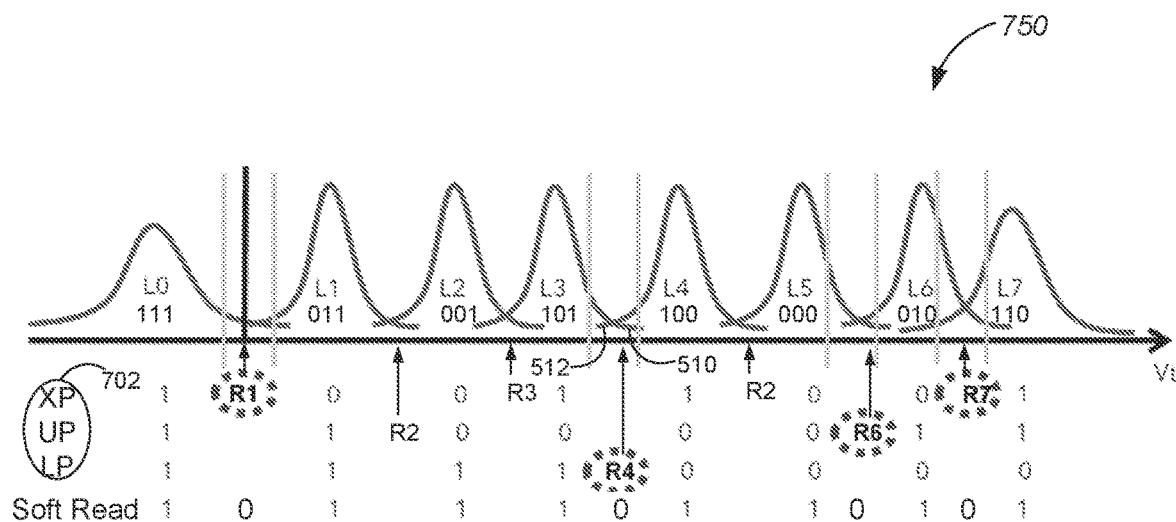
FIG. 7B illustrates a process of selecting a readout range based on the page scheme shown in FIG. 7A, in accordance with some embodiments.

FIG. 7A illustrates a page scheme 700 of a memory device 240 having a plurality of TLC memory cells, in accordance with some embodiments, and FIG. 7B illustrates a process 750 of selecting a readout range 520 based on the page scheme 700 shown in FIG. 7A, in accordance with some embodiments. In accordance with the page scheme 700, a plurality of data bits are configured to represent a plurality of data items including two consecutive data items, and the plurality of data bits are coded such that every two consecutive data items correspond to a difference (e.g., a flip) of a respective one of the plurality of data bits. For example, each of the plurality of TLC memory cells stores an ordered sequence of three bits representing a respective one of a set of consecutive data items (e.g., "111," "011," "001," "101," "100," "000," "010," and "110") including two consecutive data items (e.g., "100" and "000" corresponding to distributions L4 and L5, respectively).

In some situations, the memory device 240 selects two lowest consecutive data items (e.g., "111" and "011") to determine the page error rate 514. The two lowest consecutive data items have the lowest positions in the set of consecutive data items. Alternatively, in some situations, the memory device 240 selects two highest consecutive data items (e.g., "110" and "010") to determine the page error rate 514. The two highest consecutive data items have the highest positions in the set of consecutive data items. Alternatively, in some situations, the memory device 240 selects two middle consecutive data items (e.g., "101" and "100") as the two consecutive data items to represent the validity condition of the page 210 and determine the page error rate 514. Further, in some embodiments, the two consecutive data items are selected, in accordance with a determination the two consecutive data items correspond to a highest error rate among all data items that are stored in the page 210.

In some embodiments, each page 210 of memory cells has a plurality of subpages 702, and each subpage 702 corresponds to a respective bit of the plurality of bits representing the set of consecutive data items. For example, each MLC-based page 210 has two subpages, and each subpage corresponds to one of two bits representing a set of four consecutive data items (e.g., in FIG. 4B). Each TLC-based page 210 has three subpages 702, and each subpage 702 corresponds to one of three bits representing a set of eight consecutive data items (e.g., in FIG. 4C or 7A). Each QLC- or PLC-based page 210 has four or five subpages, and each subpage corresponds to one of four or five bits representing a set of sixteen or thirty-two consecutive data items, respectively. More specifically, for the TLC-based page 210, the three subpages 702 includes an extra page XP, an upper page UP, and a lower page LP that correspond to a most significant bit, a middle bit, and a least significant bit representing the set of eight consecutive data items.

Further, in some embodiments, the memory device 240 identifies a subset of the plurality of subpages. The subset of the plurality of subpages 702 is read with the first readout voltage VRO1 to determine the first readout data ROD1, and with the second readout voltage VRO2 to determine the second readout data ROD2. For example, the two consecutive data items selected to determine the page error rate 514 are "111" and "011" in the page scheme 700 of the memory device 240. The subset of subpages 702 includes XP. The readout voltages VRO1 and VRO2 in a valley R1 are applied on the subpage XP to determine the page error rate 514. Referring to FIG. 7A, in some embodiments, every two consecutive data items correspond to a difference of a respective one of the set of three data bits, which further corresponds to a respective subpage. Thus, the readout voltages VRO1 and VRO2 in a valley R1, R2, R3, R4, R5, R6, or R7 correspond to a respective subpage XP, UP, XP, LP, XP, UP, or XP, respectively, and are applied to determine the page error rate 514.

In some embodiments, the readout voltages VRO1 and VRO2 are successively applied in each of the valleys R1, R3, R5, and R7 to determine a respective error rate 514 for the extra page XP. For example, the memory device determines whether there is a current flowing through a memory string or not, data values 522 and 524 (e.g., data bits of upper subpages) in each memory cell, and associated threshold voltages. In some embodiments, the two consecutive data items are selected to identify a valley having the worst error rate 514, in accordance with a determination the two consecutive data items correspond to a highest error rate among all data items that are stored in the page 210. Further, in some embodiments, more than one valley having the worst error rates 514 is used to determine the error rate 514. Stated another way, when checking whether there are many errors in a word line, we can limit the checking to the worst valleys, typically the leftmost and rightmost valleys, and perhaps other valleys in the middle. In some embodiments, the memory device 240 configures a soft read command to read at valleys R1, R4, R6, and R7. A number of bits corresponding to each of these valleys is checked to determine the numbers 516 and 518 and the page error rate 514 (FIG. 5).

Referring to FIG. 7A, in some embodiments, a first subset of memory cells store a first set of two consecutive data items and correspond to a first set of two nominal threshold voltages. The memory device 240 further includes one or more second subsets of memory cells, and each second subset of memory cells stores a second set of consecutive data items and corresponding to a second set of two nominal threshold voltage. In response to the inquiry, the memory device selects a third readout voltage VRO3, and a fourth readout voltage VRO4, between the second set of two nominal threshold voltages. The third and fourth readout voltages VRO3 and VRO4 are applied to read the plurality of memory cells and generate third readout data RDO3 and fourth readout data RDO4, respectively. The error rate 514 of the page 210 is determined based on both the first readout data ROD1 and the second readout data of the first subset of memory cells ROD2 and the third readout data ROD3 and the fourth readout data ROD4 of the second subset of memory cells. In some embodiments, a portion of a memory page includes the first subset and the one or more second subsets of memory cells. The validity condition of the entire page is determined based on the portion of the page.

In some embodiments, the memory device 240 includes NAND flash memory, and each memory cell includes an NAND memory cell. The memory device 240 reads each NAND word line with a soft read command. For example, the memory device 240 reads the valleys 502 that have the most bit errors in different NAND pages in the word line. The memory device 240 counts the number of bits in the readout range 520 between two immediately adjacent distributions (e.g., L0-L7). Even if the controller 202 counts the number of bits, there is a reduction in reads, e.g., thereby decreasing background NAND operations, an NAND read array power, reducing an NAND read I/O power, decreasing an NAND read latency, reduce an NAND read I/O bandwidth, and improving QoS for host reads. The number of bits in the readout range 520 is correlated with the number of bit errors in most cases.

In some embodiments, the memory device 240 sets a readout voltage VRO in the readout range R4 to determine whether or not current flows through an NAND string of a lower subpage LP or not, a threshold voltage $V_{TH}$ for each NAND memory cell, and bit values for the memory cells of the lower subpage LP. The bit value is supposed to be "1" for memory cells associated with the distribution L3, and a subset of memory cells corresponding to a distribution tail 510 have threshold voltages higher than the readout voltage VRO and are read to output bit errors of "0." Conversely, the bit value is supposed to be "0" for memory cells associated with the distribution L4, and a subset of memory cells corresponding to a distribution tail 512 have threshold voltages lower than the readout voltage VRO and are read to output bit errors of "1." Bits in the readout range 520 typically includes more correct bits than bit errors. Some error bits are outside of the readout range 520. In some embodiments, one or more soft read commands are applied to identify bits as inside or outside the readout range 520.

Figure 8:
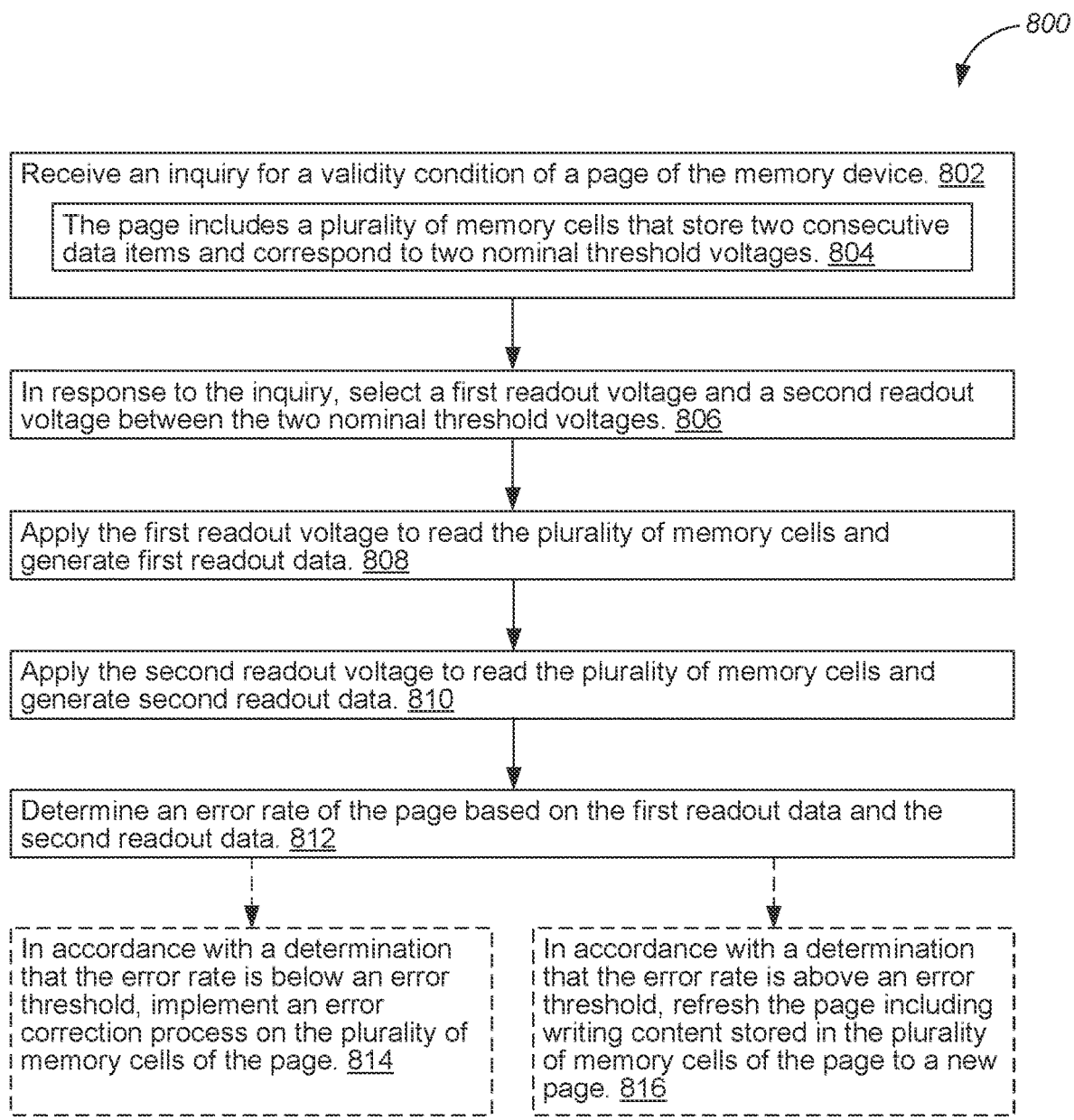
FIG. 8 is a flow diagram of an example method for monitoring a page-level validity condition of a memory device in an electronic device, in accordance with some embodiments.

FIG. 8 is a flow diagram of an example method 800 for monitoring a page-level validity condition of a memory device 240 in an electronic system, in accordance with some embodiments. The electronic system includes a memory system 200 that further includes a memory device 240 having a memory controller 202 (FIG. 2). The method 800 is implemented by the memory device 240. In an example, the memory system 200 includes one or more SSDs, each of which includes the memory controller 202 and is configured to implement the method 800. The memory device 240 (e.g., a controller 280 of the memory device 240 in FIG. 2) receives (operation 802) an inquiry for a validity condition of a page 210 of the memory device 240. The page 210 includes (operation 804) a plurality of memory cells that store at least two consecutive data items and correspond to at least two nominal threshold voltages. In response to the inquiry, the memory device 240 selects (operation 806) a first readout voltage VRO1 and a second readout voltage VRO2 between the two nominal threshold voltages. The memory device 240 applies (operation 808) the first readout voltage VRO1 to read the plurality of memory cells and generate first readout data ROD1, applies (operation 810) the second readout voltage VRO2 to read the plurality of memory cells and generate second readout data ROD2, and determines (operation 812) an error rate 514 of the page 210 based on the first readout data ROD1 and the second readout data ROD2.

In some embodiments, the first readout data ROD1 identifies a first number 516 of memory cells that store a first data item of the two consecutive data items, and the second readout data ROD2 identifies a second number 518 of memory cells that store the first data item. The memory device 240 determines the error rate 514 of the page 210 by generating a difference between the first number 516 and the second number 518 based on the first readout data ROD1 and the second readout data ROD2 and determining the error rate 514 of the page 210 based on the difference between the first number 516 and the second number 518.

In some embodiments, the first readout data ROD1 includes a plurality of first data values 522 (e.g., data bits of upper subpages UP) each of which corresponds to a distinct one of the plurality of memory cells, and the second data includes a plurality of second data values 524 (e.g., data bits of upper subpages UP) each of which corresponds to a distinct one of the plurality of memory cells. The memory device 240 determines the error rate 514 of the page 210 by applying a bitwise logic operation to combine the plurality of first data values 522 of the first readout data ROD1 and the plurality of second data values 524 of the second readout data ROD2.

In some embodiments, the memory device 240 selects the first readout voltage VRO1 and the second readout voltage VRO2 between the two nominal threshold voltages by identifying a nominal readout voltage applied to read the plurality of memory cells, identifying the first readout voltage VRO1 that is less than the nominal readout voltage by a first variation $\Delta V1$, and identifying the second readout voltage VRO2 that is greater than the nominal readout voltage by a second variation $\Delta V2$. Further, in some embodiments, the nominal readout voltage is an average of the two nominal threshold voltages. Additionally, in some embodiments, the first variation $\Delta V1$ is predefined and equal to the second variation $\Delta V2$.

In some embodiments, each of a subset of the plurality of memory cells stores one of the two consecutive data items (e.g., "100" and "011" in FIG. 5) and has a respective threshold voltage (e.g., $V_{TH4}$ and $V_{TH5}$ in FIG. 5). Based on the respective threshold voltages of memory cells, a number of memory cells storing a first data item reaches a first peak 506 at a first nominal threshold voltage (e.g., $V_{TH4}$), and a number of memory cells storing a second data item reaches a second peak 508 at a second nominal threshold voltage (e.g., $V_{TH5}$).

In some embodiments, in accordance with a determination that the error rate 514 is below an error threshold, the memory device 240 implements (operation 814) an error correction process on the plurality of memory cells of the page 210.

In some embodiments, in accordance with a determination that the error rate 514 is above an error threshold, the memory device 240 refreshes (operation 816) the page 210 including writing content stored in the plurality of memory cells of the page 210 to a new page.

In some embodiments, each memory cell stores a plurality of data bits representing a respective one of a set of consecutive data items including the two consecutive data items. In response to the inquiry, the memory device 240 selects one of (i) two lowest consecutive data items, (ii) two highest consecutive data items, and (iii) two middle consecutive data items as the two consecutive data items to represent the validity condition of the page 210.

In some embodiments, each memory cell stores a plurality of data bits. In response to the inquiry, the memory device 240 selects the two consecutive data items to represent the validity condition of the page 210. The page 210 further includes a plurality of subpages 702 (FIG. 7A), and each subpage 702 corresponds to a respective one of the plurality of data bits. The memory device 240 identifies a subset of the plurality of subpages, and the subset of the plurality of subpages is read with the first readout voltage VRO1 to determine the first readout data ROD1, and with the second readout voltage VRO2 to determine the second readout data ROD2. Further, in some embodiments, the two consecutive data items are selected, in accordance with a determination the two consecutive data items correspond to a highest error rate 514 among all data items that are stored in the page 210. Additionally, in some embodiments, the plurality of data bits are configured to represent a plurality of data items including the two consecutive data items, and the plurality of data bits are coded such that every two consecutive data items correspond to a difference of a respective one of the plurality of data bits. In some embodiments, the plurality of memory cells of the page 210 include TLC memory cells for which a set of three data bits is coded to represent eight consecutive data items. The plurality of subpages 702 of the page 210 include an upper page UP, a lower page LP, and an extra page XP, and every two consecutive data items corresponds to a difference of a respective one of the set of three data bits.

In some embodiments, in response to the inquiry, the memory device 240 selects a portion of the page 210 including the plurality of memory cells, wherein the validity condition of the entire page is determined based on the portion of the page 210.

In some embodiments, the plurality of memory cells include a first subset of memory cells storing a first set of two consecutive data items and correspond to a first set of two nominal threshold voltages. The plurality of memory cells further include one or more second subsets of memory cells, each second subset of memory cells storing a second set of consecutive data items and corresponding to a second set of two nominal threshold voltage, In response to the inquiry, for each second subset of memory cells, the memory device 240 selects a third readout voltage VRO3 and a fourth readout voltage VRO4 between the second set of two nominal threshold voltages, and applies the third and fourth readout voltage VRO4 to read the plurality of memory cells and generate third readout data ROD3 and fourth readout data ROD4, respectively. The memory device 240 determines an error rate 514 of the page 210 based on both the first readout data ROD1 and the second readout data ROD2 of the first subset of memory cells and the third readout data ROD3 and the fourth readout data ROD4 of the second subset of memory cells.

In some embodiments, the memory device 240 implements the method 800, and the memory controller 202 determines the error rate 514 of the page 210 based on the first readout data ROD1 and ROD2 (e.g., on a corresponding controller chip). Alternatively, in some embodiments, a memory channel or die where the page 210 is stored implements the method 800, and specifically, determines the error rate 514 of the page 210 based on the first readout data ROD1 and ROD2 locally on the memory channel or die (e.g., an NAND chip).

In some embodiments, effectiveness of this method 800 depends on a percentage of memory pages 210 have a high number of bit errors and need to be refreshed. The higher the percentage, the less useful the method; and the lower the percentage, the more useful the method. Running statistics could be used to determine whether or not to enable or disable the method 800 during run-time. In an example, 30% of the NAND word lines have high bit errors, and there are three subpages (XP, UP, and LP) per word line in a TLC SSD. Each soft read uses double the NAND array power as a normal read. Compared to performing three normal reads without the invention, the read array power would be 96% (e.g., a combination of 33%, 33%, and 30%). The read I/O bandwidth would be 63% (e.g., a combination of 33% and 30%). The read I/O bandwidth would be 30% if the memory device 240 could count the valley bits.

Memory is also used to store instructions and data associated with the method 800, and includes high-speed random-access memory, such as SRAM, DDR DRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 800. Alternatively, in some embodiments, the electronic system implements the method 800 at least partially based on an ASIC. The memory system 200 of the electronic system includes an SSD in a data center or a client device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method implemented at a memory device for memory data validation, comprising:
   receiving an inquiry for a validity condition of a page of the memory device, wherein the page includes a plurality of memory cells that store at least two consecutive data items and correspond to at least two nominal threshold voltages;
   in response to the inquiry, selecting a first readout voltage and a second readout voltage between the two nominal threshold voltages;
   applying the first readout voltage to read the plurality of memory cells and generate first readout data;
   applying the second readout voltage to read the plurality of memory cells and generate second readout data; and
   determining an error rate of the page based on the first readout data and the second readout data.

2. The method of claim 1, wherein the first readout data identifies a first number of memory cells that store a first data item of the two consecutive data items, and the second readout data identifies a second number of memory cells that store the first data item, determining the error rate of the page further comprising:
   generating a difference between the first number and the second number based on the first readout data and the second readout data; and
   determining the error rate of the page based on the difference between the first number and the second number.

3. The method of claim 1, wherein the first readout data includes a plurality of first data values each of which corresponds to a distinct one of the plurality of memory cells, and the second readout data includes a plurality of second data values each of which corresponds to a distinct one of the plurality of memory cells, and determining the error rate of the page further comprising:
   applying a bitwise logic operation to combine the plurality of first data values of the first readout data and the plurality of second data values of the second readout data.

4. The method of claim 1, selecting the first readout voltage and the second readout voltage between the two nominal threshold voltages further comprising:
   identifying a nominal readout voltage applied to read the plurality of memory cells;
   identifying the first readout voltage that is less than the nominal readout voltage by a first variation; and
   identifying the second readout voltage that is greater than the nominal readout voltage by a second variation.

5. The method of claim 4, wherein the nominal readout voltage is an average of the two nominal threshold voltages.

6. The method of claim 4, wherein the first variation is predefined and equal to the second variation.

7. The method of claim 1, wherein:
   each of a subset of the plurality of memory cells stores one of the two consecutive data items and has a respective threshold voltage; and
   based on the respective threshold voltages of memory cells, a number of memory cells storing a first data item reaches a first peak at a first nominal threshold voltage, and a number of memory cells storing a second data item reaches a second peak at a second nominal threshold voltage.

8. The method of claim 1, further comprising:
   in accordance with a determination that the error rate is below an error threshold, implementing an error correction process on the plurality of memory cells of the page.

9. The method of claim 1, further comprising:
   in accordance with a determination that the error rate is above an error threshold, refreshing the page including writing content stored in the plurality of memory cells of the page to a new page.

10. The method of claim 1, wherein each memory cell stores a plurality of data bits representing a respective one of a set of consecutive data items including the two consecutive data items, the method further comprising, in response to the inquiry:
    selecting one of (i) two lowest consecutive data items, (ii) two highest consecutive data items, and (iii) two middle consecutive data items as the two consecutive data items to represent the validity condition of the page.

11. A memory device, comprising:
    control circuitry; and
    memory having one or more programs stored thereon, the one or more programs including instructions for:
        receiving an inquiry for a validity condition of a page of the memory device, wherein the page includes a plurality of memory cells that store at least two consecutive data items and correspond to at least two nominal threshold voltages;
        in response to the inquiry, selecting a first readout voltage and a second readout voltage between the two nominal threshold voltages;

applying the first readout voltage to read the plurality of memory cells and generate first readout data;
applying the second readout voltage to read the plurality of memory cells and generate second readout data; and
determining an error rate of the page based on the first readout data and the second readout data.

12. The memory device of claim 11, wherein each memory cell stores a plurality of data bits, the one or more programs further comprising instructions for, in response to the inquiry:
selecting the two consecutive data items to represent the validity condition of the page, the page further including a plurality of subpages, each subpage corresponding to a respective one of the plurality of data bits; and
identifying a subset of the plurality of subpages, wherein the subset of the plurality of subpages is read with the first readout voltage to determine the first readout data, and with the second readout voltage to determine the second readout data.

13. The memory device of claim 12, wherein the two consecutive data items are selected, in accordance with a determination that the two consecutive data items correspond to a highest error rate among all data items that are stored in the page.

14. The memory device of claim 12, wherein the plurality of data bits are configured to represent a plurality of data items including the two consecutive data items, and the plurality of data bits are coded such that every two consecutive data items correspond to a difference of a respective one of the plurality of data bits.

15. The memory device of claim 12, wherein:
the plurality of memory cells of the page include triple-level cells (TLC) for which a set of three data bits is coded to represent eight consecutive data items; and
the plurality of subpages of the page include an upper page, a lower page, and an extra page, and every two consecutive data items corresponds to a difference of a respective one of the set of three data bits.

16. A non-transitory computer-readable storage medium having one or more programs stored thereon, the one or more programs comprising instructions for:
receiving an inquiry for a validity condition of a page of a memory device, wherein the page includes a plurality of memory cells that store at least two consecutive data items and correspond to at least two nominal threshold voltages;
in response to the inquiry, selecting a first readout voltage and a second readout voltage between the two nominal threshold voltages;
applying the first readout voltage to read the plurality of memory cells and generate first readout data;
applying the second readout voltage to read the plurality of memory cells and generate second readout data; and
determining an error rate of the page based on the first readout data and the second readout data.

17. The non-transitory computer-readable storage medium of claim 16, the one or more programs further comprising instructions for:
in response to the inquiry, selecting a portion of the page including the plurality of memory cells, wherein the validity condition of the page is determined based on the portion of the page.

18. The non-transitory computer-readable storage medium of claim 16, wherein:
the plurality of memory cells include a first subset of memory cells storing a first set of two consecutive data items and correspond to a first set of two nominal threshold voltages;
the plurality of memory cells further include one or more second subsets of memory cells, each second subset of memory cells storing a second set of consecutive data items and corresponding to a second set of two nominal threshold voltage; and
the one or more programs further comprising instructions for, in response to the inquiry:
for each second subset of memory cells, selecting a third readout voltage and a fourth readout voltage between the second set of two nominal threshold voltages, and applying the third and fourth readout voltages to read the plurality of memory cells and generate third readout data and fourth readout data, respectively; and
determining an error rate of the page based on both the first readout data and the second readout data of the first subset of memory cells and the third readout data and the fourth readout data of the second subset of memory cells.

19. The non-transitory computer-readable storage medium of claim 16, wherein the first readout data identifies a first number of memory cells that store a first data item of the two consecutive data items, and the second readout data identifies a second number of memory cells that store the first data item, determining the error rate of the page further comprising:
generating a difference between the first number and the second number based on the first readout data and the second readout data; and
determining the error rate of the page based on the difference between the first number and the second number.

20. The non-transitory computer-readable storage medium of claim 16, wherein the first readout data includes a plurality of first data values each of which corresponds to a distinct one of the plurality of memory cells, and the second readout data includes a plurality of second data values each of which corresponds to a distinct one of the plurality of memory cells, and determining the error rate of the page further comprising:
applying a bitwise logic operation to combine the plurality of first data values of the first readout data and the plurality of second data values of the second readout data.

* * * * *